United States Patent
Dhawan et al.

(10) Patent No.: US 9,082,129 B2
(45) Date of Patent: Jul. 14, 2015

(54) PROVIDING RECOMMENDATIONS ON A SOCIAL NETWORKING SYSTEM PAGE

(75) Inventors: Rohit Dhawan, San Francisco, CA (US); Jeffrey Andrew Kanter, San Francisco, CA (US); Thomas Giovanni Carriero, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 60 days.

(21) Appl. No.: 13/325,036

(22) Filed: Dec. 13, 2011

(65) Prior Publication Data
US 2013/0151613 A1   Jun. 13, 2013

(51) Int. Cl.
| | | |
|---|---|---|
| *G06F 15/16* | (2006.01) | |
| *G06Q 30/02* | (2012.01) | |
| *G06Q 10/10* | (2012.01) | |
| *G06Q 50/00* | (2012.01) | |

(52) U.S. Cl.
CPC ............... *G06Q 30/02* (2013.01); *G06Q 10/10* (2013.01); *G06Q 50/01* (2013.01)

(58) Field of Classification Search
CPC ...................................................... G06Q 50/01
USPC ................................... 709/204; 705/319, 347
See application file for complete search history.

(56) References Cited

U.S. PATENT DOCUMENTS

| | | | | |
|---|---|---|---|---|
| 7,478,078 | B2 * | 1/2009 | Lunt et al. .............................. 1/1 |
| 7,669,123 | B2 * | 2/2010 | Zuckerberg et al. .......... 715/273 |
| 8,234,688 | B2 * | 7/2012 | Grandison et al. ................ 726/1 |
| 8,473,304 | B2 * | 6/2013 | Black .............................. 705/1.1 |
| 8,499,247 | B2 * | 7/2013 | Niyogi et al. .................. 715/753 |
| 2006/0143066 | A1 * | 6/2006 | Calabria ........................... 705/10 |
| 2009/0100469 | A1 * | 4/2009 | Conradt et al. .................. 725/46 |
| 2010/0036912 | A1 * | 2/2010 | Rao ................................. 709/204 |
| 2010/0169364 | A1 * | 7/2010 | Hardt ............................. 707/769 |
| 2010/0235201 | A1 * | 9/2010 | McEvoy ............................ 705/5 |
| 2011/0040756 | A1 * | 2/2011 | Jones et al. .................... 707/737 |
| 2012/0047147 | A1 * | 2/2012 | Redstone et al. .............. 707/748 |
| 2012/0109835 | A1 * | 5/2012 | Barefoot et al. .............. 705/319 |
| 2012/0109836 | A1 * | 5/2012 | Chen et al. .................... 705/319 |
| 2012/0166535 | A1 * | 6/2012 | Deng et al. .................... 709/204 |
| 2012/0233158 | A1 * | 9/2012 | Braginsky et al. ............ 707/724 |
| 2012/0323909 | A1 * | 12/2012 | Behforooz et al. ........... 707/728 |
| 2013/0006978 | A1 * | 1/2013 | Cierniak et al. .............. 707/728 |
| 2013/0014284 | A1 * | 1/2013 | Vernal et al. .................... 726/28 |
| 2013/0041733 | A1 * | 2/2013 | Officer et al. .............. 705/14.16 |
| 2013/0046542 | A1 * | 2/2013 | Papakipos et al. ............ 704/270 |
| 2013/0055354 | A1 * | 2/2013 | Weinberg et al. .................. 726/4 |
| 2013/0073983 | A1 * | 3/2013 | Rasmussen et al. .......... 715/753 |
| 2013/0080427 | A1 * | 3/2013 | Cross et al. ................... 707/728 |
| 2013/0097246 | A1 * | 4/2013 | Zifroni et al. ................. 709/204 |
| 2013/0110876 | A1 * | 5/2013 | Meijer et al. ................. 707/783 |
| 2013/0117261 | A1 * | 5/2013 | Sambrani ...................... 707/734 |
| 2013/0124539 | A1 * | 5/2013 | Lin et al. ....................... 707/749 |

* cited by examiner

*Primary Examiner* — Douglas Blair
(74) *Attorney, Agent, or Firm* — Fenwick & West LLP

(57) ABSTRACT

A social networking system provides tips to users about non-user entities within the social networking system. Tips include short questions, comments, reviews and non-user entities include businesses, products, bands, songs etc. Tips are provided by users of the social networking system, wherein the tips are displayed to other users of if the other users meet privacy criteria associated with the tips. Additionally, tips are ranked based on the likelihood that a user will view or read the tip. Tips with the greatest likelihood are ranked higher than those with a lower likelihood. Selected tips with a high likelihood to be viewed are displayed to a viewing user on the topic page or within the user's news feed story.

20 Claims, 5 Drawing Sheets

US 9,082,129 B2

PROVIDING RECOMMENDATIONS ON A SOCIAL NETWORKING SYSTEM PAGE

BACKGROUND

Described embodiments relate generally to sharing content within a social networking system and particularly to sharing recommendations for a non-user entity within the social networking system.

Content providers often allow users to review a business or an item. For example, a user may be enabled to post a review for a song, a band, a book, a restaurant, a business, etc., on one or more webpages associated with an object of the review. The review may be posted on the webpage wherein others can read the review when visiting the webpage. Reviews often provide insights into objects being reviewed, such that a user may decide whether to purchase the object or visit an establishment.

However, users may not trust reviews posted by strangers on a content provider's webpage. For example, a review may be biased or a reviewer may use or experience an object differently than the viewing user. Thus, viewing users often discount reviews and recommendations provided by others. Some content providers allow users to rate other reviews and reviewers based on a level of helpfulness. Thus, viewing users may pay more attention to reviews that have received a higher rating. Nonetheless, a viewing user may not trust the reviewer's opinions or give credibility to the review.

Product or business reviews are often lengthy and may be provide more detail than a viewing user wants to read. For example, a review may contain a lengthy list of pros and cons about a business or a product; however, a user may not be interested in reading a lengthy review. In such an instance, a user may not read or utilize the reviews listed on a content provider's webpage.

SUMMARY

Described embodiments enable a social networking system to collect tips posted by a user and provide the collected tips to a viewing user. A tip typically appears as a short recommendation or review. In one embodiment, the tip is posted on a topic page dedicated to a topic of interest, such as a business, a product, a song, a band, etc. In one embodiment, a viewing user is presented with a tip posted on topic page when the viewing users visits the topic page within the social networking system.

In one embodiment, the social networking system collects tips shared by users of the social networking system. The tips may be collected from a user interface prompting users to share a tip about a topic within the social networking system. In other instances, the tips may be imported from content providers outside the social networking system. For example, a tip shared by a social networking user on an application or a webpage outside the social networking system may be imported into the social networking system by a social plug-in.

Additionally, the social networking system analyzes the collected tips to identify tips to display to a viewing user. The social networking system may select tips to display if the social networking system privacy settings provided by the sharing user are met by the viewing user and based on a relevance score of the tip. A relevance score for a tip may be computed based on the quality of relationship between two users within the social networking system, the time elapsed since the tip was shared, etc. As such, the social networking system may select one or more tips to display to a viewing user.

The features and advantages described in this summary and the following detailed description are not all-inclusive. Many additional features and advantages will be apparent to one of ordinary skill in the art in view of the drawings, specification, and claims thereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system includes users connected to each other. In one embodiment, each user is provided with a profile page comprising a wall wherein the user and others may post comments, pictures, videos, etc. Social networking system users may also create topic pages, separate from profile pages, and that are dedicated to an idea or a topic of interest. For example, social networking system users may create topic pages for businesses, organizations, products, bands, songs, etc. A topic page may also include a wall where social networking system users may post comments, picture, videos and tips (hereinafter, also referred to as 'recommendations') that may be relevant to the topic page. Embodiments of the invention provide a shared place on the topic page wherein users can ask for tips and share tips related to the topic page. In one embodiment, a tip is a short recommendation, a review or a question posted on a topic page within the social networking system.

Figure 1:
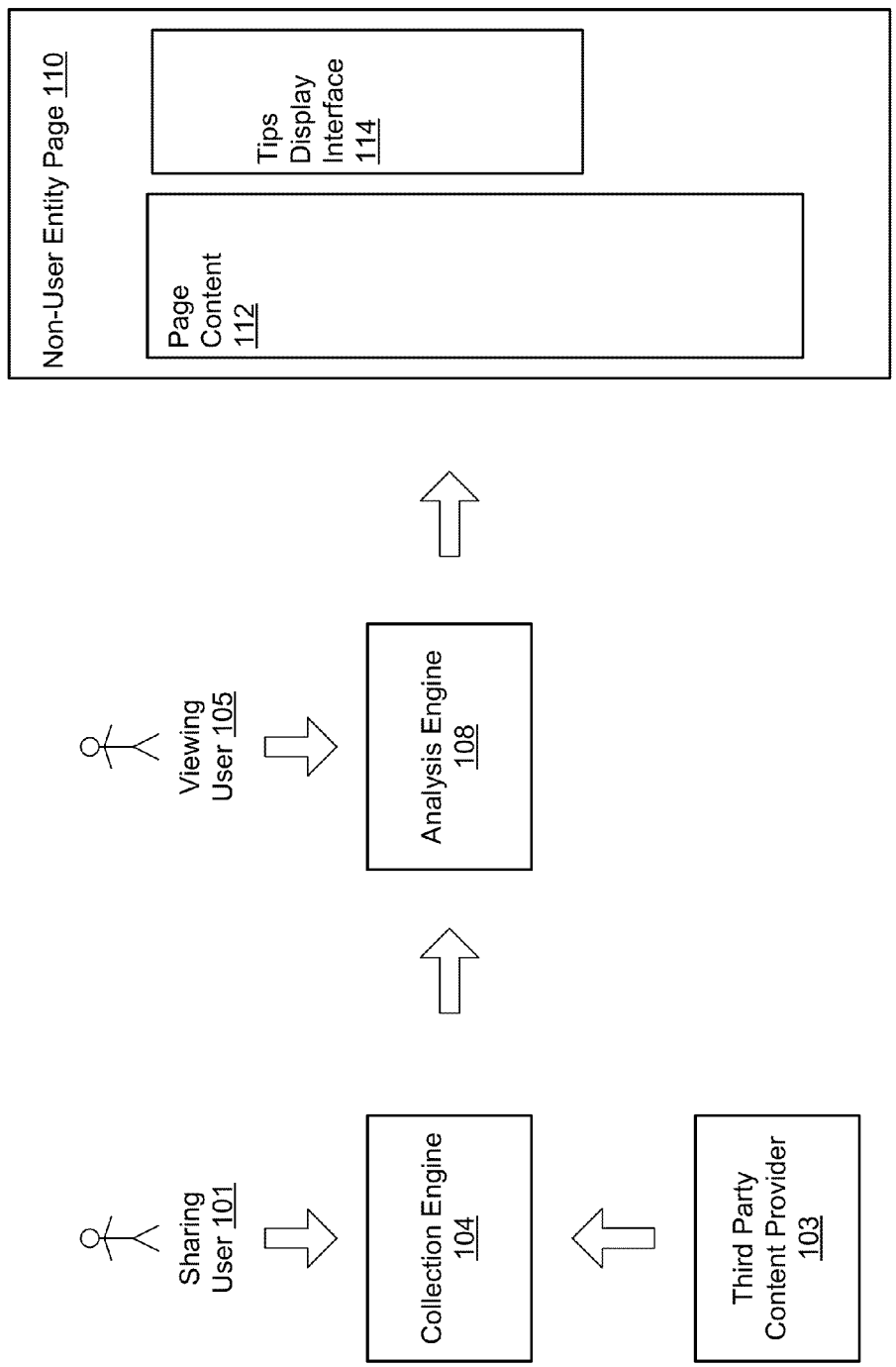
FIG. 1 illustrates a system for displaying tips to a viewing user, in accordance with an embodiment of the invention.

FIG. 1 illustrates a system for displaying tips to a viewing user in accordance with an embodiment of the invention. The illustrated system includes a sharing user 101, a third party content provider 103, a collection engine 104, a viewing user 105, an analysis engine 108, a topic page 110, page content 112 and a tips display interface 114.

In one embodiment, the collection engine 104 collects tips about a topic within the social networking system. Tips can be provided by a sharing user 101 in a tips user interface within the social networking system. For example, a user interface element may prompt a user to share a recommendation about a topic. If the user provides a recommendation, the collection engine 104 captures the user's recommendation. In another embodiment, the collection engine 104 captures a user's recommendation from a third party content provider 103 outside the social networking system. For example, if a social networking system user has provided a review or a recommendation on a third-party webpage hosted by a third party content provider 103, the collection engine 104 captures the user's social networking identity and the recommendation. In another embodiment, a user interface is provided on a third-party webpage to allow a user to make a recommendation associated with the third-party webpage on the social networking engine. The collection engine 104 captures the user's recommendation and associate it with a topic page that is associated with the third-party webpage within the social networking system.

The analysis engine 108 analyzes the tips collected by the collection engine 104 to identify tips to display to a viewing user 105. In one embodiment, tips are selected by the analysis engine 108 if the sharing user 101 and the viewing user 105 have an affinity for one another. Affinity can be determined through explicit friendship, common group affiliation, mutual friendships, or other connections within the social networking system. In another embodiment, the analysis engine 108 identifies tips that are most relevant to a viewing user. A tip is considered relevant to a viewing user if it is posted by users that communicate with the viewing user, users who are near the viewing user's location, users who live near the viewing user, users who share common interests with the viewing user, etc. In another embodiment, the analysis engine 108 also performs a sentiment analysis to determine which tips to display to the viewing user 105. In one embodiment, the analysis engine 108 selects tips that have been shared recently, or have several responses before displaying tips that are older or have fewer responses.

The social networking system displays the selected tips to the viewing user 105. In one embodiment, the social networking system displays the tip on a topic page 110 of the social networking system. A topic page 110 comprises a page for a business, a product, a band, a song, a game, etc. The topic page 110 includes page content 112, such as comments, pictures, videos, links, etc., associated with the page 110 and a tips display interface 114. The tips interface 114 includes tips collected by the collection engine 104 and selected by the analysis engine 108 to display to each viewing user 105. Thus, the tips display interface 114 may be different for each viewing user 105. In one embodiment, the tips display interface 114 includes an identity of the sharing user 101 and the tip shared by the user 101. The interface 114 may also include comments and feedback associated with the tip and provided by other users of the social networking system. As such, the social networking system provides a shared place on the topic page wherein users can ask for tips and share tips associated with the topic. In one embodiment, the tips interface 114 enables a sharing user to select whether to publicly or privately share the tip, wherein a publicly shared tip is shared with everyone. In one embodiment, the page displaying the tip may display the tip to everyone viewing the page if the tip is share publicly. Additionally, if the tip is share publicly, the page may display a tip only to the sharing user and the sharing user's friends within the social networking system after a predetermined period of time.

System Architecture

Figure 2:
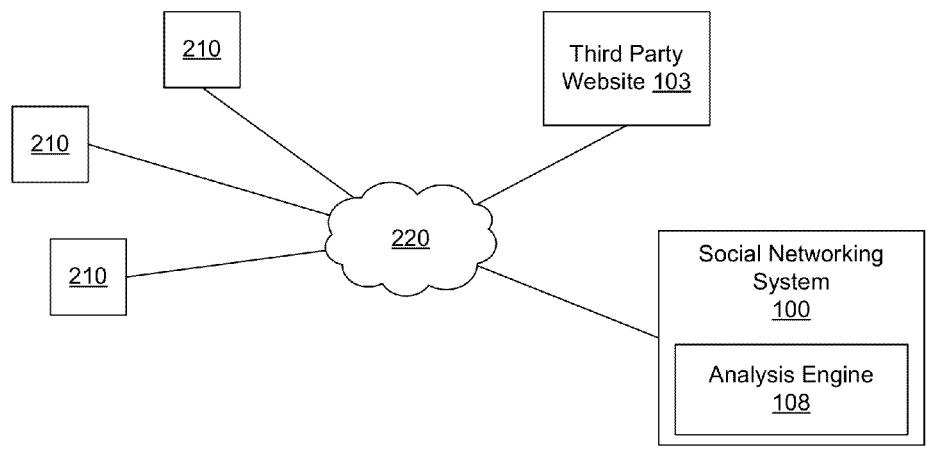
FIG. 2 is a network diagram including a social networking system for displaying tips to a user, in accordance with an embodiment of the invention.

FIG. 2 is a block diagram illustrating a system environment suitable for operation of a social networking system 100. The system environment comprises one or more client devices 210, one or more third-party website 103, network 220 and a social networking system 100 comprising an analysis engine 108. In alternative configurations, different and/or additional modules can be included in the system.

The client devices 210 comprise one or more computing devices that can receive user input and can transmit and receive data via the network 220. For example, the client devices 210 may be desktop computers, laptop computers, tablet computers (pads), smart phones, personal digital assistants (PDAs), or any other device including computing functionality and data communication capabilities. The client devices 210 are configured to communicate via network 220, which may comprise any combination of local area and/or wide area networks, using both wired and wireless communication systems. The third party content provider 103 may be coupled to the network 220 for communicating messages to the social networking system 100 about the users' actions off the system 100.

Figure 3:
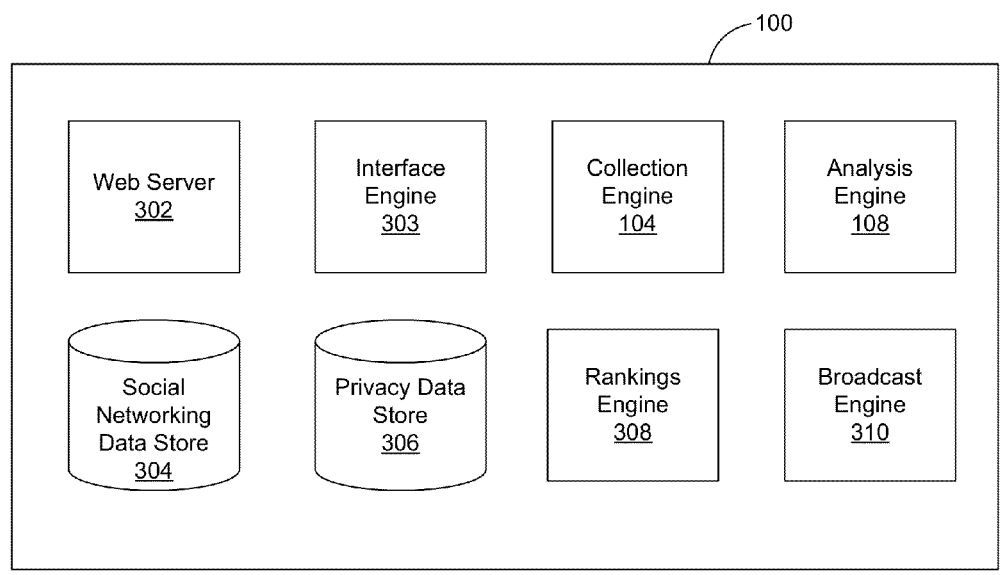
FIG. 3 is a block diagram of a social networking system for displaying tips to a user, in accordance with an embodiment of the invention.

FIG. 3 is a block diagram of a social networking system 100 for displaying tips to a user, in accordance with an embodiment of the invention. The social networking system 100 includes a web server 302, an interface engine 303, a social networking data store 304, a collection engine 104, a privacy data store 306, a rankings engine 308, a broadcast engine 310 and an analysis engine 108. In other embodiments, the social networking system 100 may include additional, fewer, or different modules for various applications.

The web server 302 links the social networking system 100 via the network 220 to one or more client devices 210, as well as to one or more third party websites 103. The web server 302 may include a mail server or other messaging functionality for receiving and routing messages between the social networking system 100 and the client devices 210 or third party websites 103. The messages can be instant messages, queued messages (e.g., email), text and SMS messages, or any other suitable messaging technique. Additionally, the web server 302 links the social networking system 100 to client devices 210 wherein the client devices can be used to log into the social networking system.

The social networking data store 304 includes social networking system information that is tracked and maintained by a social networking system. In one embodiment, the social networking system data is stored as a social graph within the social networking system data store 304. The social graph includes a plurality of nodes that are interconnected by a plurality of edges (representing interactions, connections, communications or other measures of relatedness between nodes). A social graph node represents a social networking system object that can act on and/or be acted upon by another node. An edge between nodes in a social graph represents any kind of connection or interaction between the two nodes, which results from an action that was performed by one of the nodes on the other node. In this description, reference to an edge connecting two objects in a social graph is intended to refer to an edge connecting the nodes representing each of the two objects. In one embodiment, the social graph is used by the collection engine 104 and the analysis engine 108 to display tips to a viewing user within the social networking system 100. In one embodiment, a topic page is stored as a node within the social graph. As described, a topic page may be dedicated to a topic of interest such as a business, a product, a band, a song, etc.

In one embodiment, an interface engine 303 generates a user interface prompting users to provide a tip associated with a topic. In one embodiment, the prompt identifies the topic to be recommended and a text box wherein a user can input a question, a recommendation or a tip about the topic. In one embodiment, the user interface provides a portion of a sentence that can be completed by a user. For example, the prompt may provide: "I like this store because . . . ," wherein the user can complete the sentence. In one embodiment, the interface engine 303 limits the number of characters a user can type in the input text box. A limit on the number of characters causes the users to provide short tips about the non-user entity as opposed to lengthy reviews about the entity. Shorter recommendations or tips allow viewing users 105 to quickly identify items of interest associated with the topic.

In one embodiment, the user interface prompting a user to provide a tip may be displayed to the user by the interface engine 303 when a user visits the topic page. For example, if a sharing user 101 visits a topic page 110 on running, the user may be provided with an interface prompting the user to recommend a running trail or running shoes, etc. In another embodiment, the user interface prompt requesting a user to share a tip is provided to the user when a user checks-into a business or a place. For example, if a user checks-in at a restaurant, the interface engine 303 provides a prompt to the user to recommend a menu item at the restaurant. Similarly, if a user mentions a topic in a status message or a wall post, etc., the interface engine 303 provides an interface prompting a user to provide a tip for the topic. In another instance, if a user uploads a geo-tagged photo associated with a location, a place of business or interest, the interface engine 303 provides an interface prompting the user to provide a tip associated with the location.

In another embodiment, the interface engine 303 provides an interface prompting a user to provide a tip on a third-party application or webpage outside of the social networking system 100. The interface prompting a user to provide a tip is presented in a frame or window of a webpage when it is rendered and displayed on a user device via a social plug-in or an i-frame. In one instance, a user device requests a web page from a web server of a third-party website, which is separate from a web server of a social networking system. The web server from the third-party website sends a markup language document for the requested web page to the user device. The markup language document includes an instruction for a browser application running on the user device to incorporate within the web page information obtained from the social networking system. In one embodiment, the instruction creates a frame within the web page that contains content pulled directly from the social networking system (e.g., an iframe). Based on the instruction in the received markup language document, the user device requests the tip input interface from the social networking system, which determines the social networking system identity of the user visiting the third-party webpage or application. Thereafter, the user device renders the web page with the tip input interface contained within the frame and displays the rendered web page to the user. In this way, the third-party website has a mechanism for incorporating a social networking system's interface content for the user based on social information.

The collection engine 104 collects tips shared by users of the social networking system. In one embodiment, the collection engine 104 stores the tips received from users in the social networking data store 304. In one embodiment, the shared tips are stored in the social graph as edges connecting a node representing a sharing user 101 and a node representing a topic page 110 within the social networking system. In one embodiment, the collection engine 104 collects tips from third party content providers 103.

The analysis engine 108 analyzes tips associated with a topic to identify tips to display to a viewing user 105. In one embodiment, the analysis engine 108 selects a tip to display to a viewing user 105 if the viewing user meets the privacy criteria of the sharing user 101. The privacy data store 306 stores a user's social networking system privacy settings. Privacy settings specify who can view content shared by a user within and outside the social networking system 100. For example, a user may provide that only his or her friends within the social networking system are allowed to view content shared by the user. Users may also provide that only friends of friends, or users in a same social network as the user, or everyone is allowed to view the shared content. In other instances, users may provide names of users who are allowed to or disallowed from viewing content shared by the user. Additionally, users may also provide the type of content that each user or user group may be allowed to view. For example, a user may provide that users in a same social network are allowed to view his or her status messages but only friends are allowed to view photos and videos posted by the user. As such, the analysis engine 108 identifies tips that a viewing user 105 is allowed to view based on the sharing user's privacy settings. For example, if the sharing user 101 provides that only his or her friends are allowed to view wall posts or tips shared by the user, then the sharing user's tip is only provided to the user viewing user 105, if the viewing user 105 is friends with the sharing user 101 within the social networking system 100.

The rankings engine 308 ranks tips based on a likelihood that a viewing user 105 is interested in reading the tip. The ranking engine 308 identifies such tips based on one or more of, the number of interactions between the sharing user 101 and the viewing user 105, the time elapsed since the tip was shared, the number of comments or likes associated with the tip and ratings provided by the topic page 110 administrator. In one instance, the rankings engine 308 ranks tips based on the number of interactions between the sharing user 101 and the viewing user 105. The rankings engine 308 counts the number of edges between a node representing the sharing user 101 and a node representing the viewing user 105 within the social graph to determine the number of interactions between the two users. Tips provided by users who have interacted more frequently with the viewing user are prioritized higher by the rankings engine 308. Similarly, the rankings engine 308 ranks tips that are shared recently higher than tips that are older. In one embodiment, the rankings engine 308 ranks tips with the most recent comments, regardless of when the tip was shared. In another embodiment, the rankings engine 308 ranks tips based on the number of comments and likes the tip has received. For example, a tip with several likes and comments are ranked higher than a tip with fewer likes and comments. In one embodiment, the rankings engine 308 ranks a tip higher if it is endorsed by the topic's page administrator. A page administrator may endorse a tip for any reason; in such an instance, the endorsed tip is ranked higher than an unendorsed tip. In one embodiment, the rankings engine 308 ranks tips based on all the rankings criteria provided herein. In such an instance, the rankings are based on a weighted score, wherein each category is weighted differently based on the topic of the topic page and the number of tips available to display to the user. For example, if many tips include a particular word, the rankings engine 308 selectively ranks one tip including the word to display to the user.

The broadcast engine 310 broadcasts tips to a viewing user 105. In one embodiment, the broadcast engine 310 places the tip in the viewing user's news feed. A news feed is a collection of actions performed by a user's friends and placed in display stream. Actions within the social networking system include, but are not limited to status updates, wall posts or any action performed within the social networking system. In one embodiment, the broadcast engine 310 adds a tip to a viewing user's 105 newsfeed story. The newsfeed story includes a sharing user's name, content of the tip and a link to visit the topic page 110 associated with the tip. In another embodiment, the broadcast engine 310 provides the tip to the viewing user 105 when the user visits the page associate with the topic.

Figure 4:
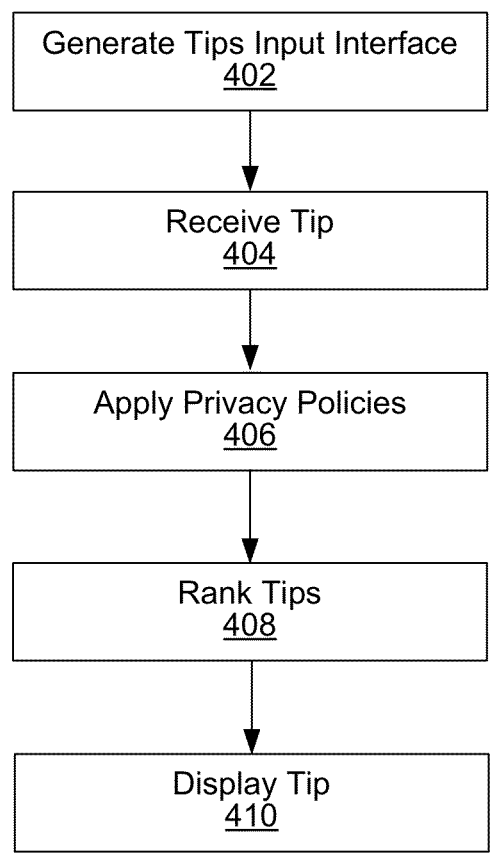
FIG. 4 is a flowchart of a process for displaying tips to a user, in accordance with an embodiment of the invention.
Figure 5A:
FIG. 5A is a user interface prompting a user to provide a tip, in accordance with an embodiment of the invention.
Figure 5B:
FIG. 5B is a user interface for checking-in at a location, in accordance with an embodiment of the invention.
Figure 5C:
FIG. 5C is a user interface including an interface element for leaving a tip, in accordance with an embodiment of the invention.
Figure 6:
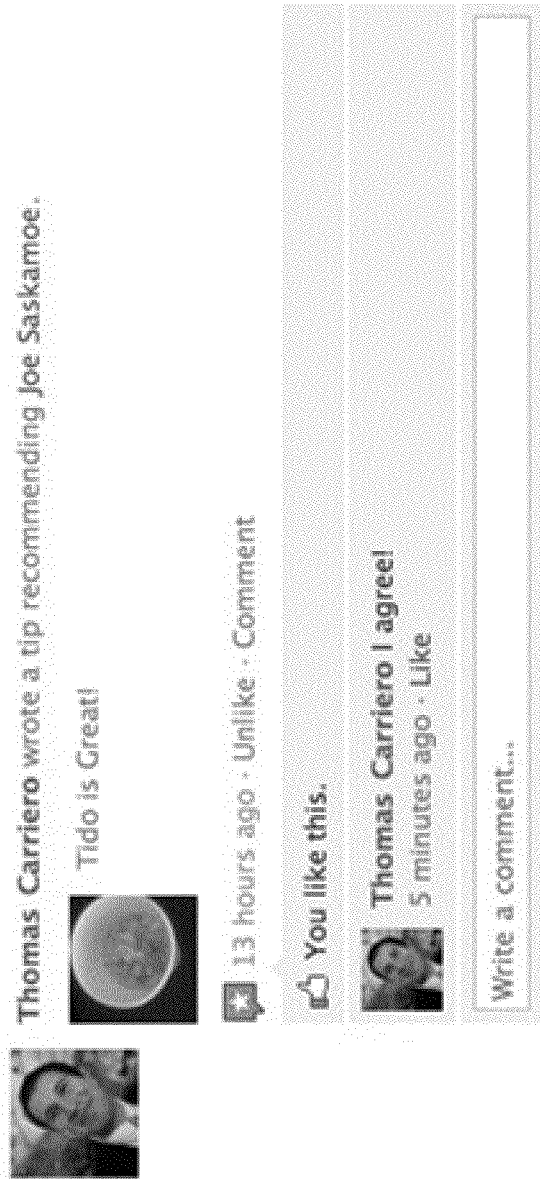
FIG. 6 is a user interface displaying a tip within the social networking system, in accordance with an embodiment of the invention.

FIG. 4 is a flowchart of a process for displaying tips to a user in accordance with an embodiment of the invention. FIGS. 5A, 5B, 5C and 6 illustrate exemplary user interfaces for prompting a user to provide a tip and displaying a tip to a viewing user. For the purposes of discussion below, FIGS. 4-6 are discussed concurrently.

In one embodiment, the social networking system generates 402 a tips input interface. A tips input interface prompts a user to provide a tip for a topic within the social networking system. As described above, a tip includes a question, a review, a recommendation or a comment about a topic within the social networking system. FIG. 5A illustrates a user interface prompting a user to provide a tip, in accordance with an embodiment of the invention. In one embodiment, the input interface includes a name of the topic, a message, an input field wherein a user can enter a tip, an interface element allowing a user to recommend the topic, a 'Don't Recommend' user interface element and an interface element allowing a user to close the user interface prompt. Other embodiments include a subset or superset of these elements.

In one embodiment, the user interface prompt 502 is displayed to a sharing user 101 when a user navigates to a topic page within the social networking system. In another embodiment, the user interface prompt is provided once a user checks-in at a location. FIG. 5B is a user interface for checking-in at a location on a mobile computing device. Once a user has checked-in at a location, the user is provided with a user interface element to provide a tip about the location. FIG. 5C is a user interface including an interface element for leaving a tip in accordance with an embodiment of the invention. A user can select the 'Leave a Tip' interface element to leave a tip about the location wherein the user checked-in. In one embodiment, the user interface element is generated 402 on a third-party webpage not connected to the social networking system.

The social networking system receives 404 the tip from the user. In one embodiment, the received tip includes a sharing user's identity and tip content. In one embodiment, the social networking system stores the tip as an edge connecting a sharing user with a topic. The content of the tip is stored within the social networking system such that it is displayed to a viewing user.

The social networking system applies 406 privacy policies associated with each tip to determine whether a tip should be displayed to a viewing user. A sharing user's privacy policies provide who can view content shared by the user. For example, if sharing user's privacy policy provide that only friends of the user may view content shared by the user, then the social networking system applies 406 the sharing users privacy policy and displays the shared tip only to users who are friends with the sharing user within the social networking system.

The social networking system ranks 408 tips to be displayed to a viewing user. In some instances, tips are ranked based on one or more of the number of interactions between the sharing user and the viewing user, the time elapsed since the tip was shared, the number of comments or likes associated with the tip and ratings provided by the topic page administrator.

The social networking system displays 410 the ranked tips to a viewing user. In one embodiment, the tips are displayed on a shared space between users on a topic page within the social networking system. Similarly, the tips may be shared as part of a newsfeed story, on the viewing user's wall or when a user checks-in at a location associated with the tip. The social networking system also may display 410 comments and likes associated with the tip. FIG. 6 is a user interface displaying a tip within the social networking system. The user interface displaying a tip may include a sharing user's identity, a topic's identity, likes and comments associated with the tip.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   providing, to a client device associated with a first user of a plurality of users of a social networking system, a user interface for display to the first user;
   receiving from the first user, via the client device, a check-in at a location associated with a page in the social networking system, wherein the page is a social networking system page about at least one of a product, a business, a location, and a topic of interest, and wherein the page is a node in a social graph of the social networking system;
   responsive to receiving the check-in, providing a user interface element for receiving a tip associated with the page;
   receiving, via the client device, a tip from the first user that is associated with the page;
   identifying a plurality of tips, including the received tip, that are associated with the page, the plurality of tips shared by one or more of the plurality of users of the social networking system;
   receiving, via a second client device, a request from a second user of the plurality of users to display one or more of the plurality of tips associated with the page, wherein each tip is associated with privacy criteria that identify users having permission to view that tip;
   determining that the second user meets privacy criteria associated with a set of candidate tips of the plurality of tips;
   selecting, by a computer processor, one or more tips, including the received tip, from the set of candidate tips to display to the second user based in part on the second user meeting the privacy criteria associated with the received tip and a relevancy score associated with the received tip, the relevancy score providing a likelihood the second user will view the received tip and is based in part on a number of interactions between the second user and the first user within the social networking system; and
   responsive to the selecting, providing the page to the second client device, the page displaying the selected one or more tips.

2. The method of claim 1, wherein the received tip comprises at least one of a comment, a question, a short recommendation and a short review.

3. The method of claim 1, wherein the received tip is received in reference to the first user visiting the page.

4. The method of claim 1, wherein the received tip is received in reference to the first user uploading geo-tagged photos, or is in reference to a location of the geo-tagged photo.

5. The method of claim 1, wherein the user interface is also provided to users of the social networking system who at least one of visit the page and upload geo-tagged photos.

6. The method of claim 1, wherein the user interface is also provided to users of the social networking system on a third party web-page, the user interface provided via a social plug-in displaying social networking information on a portion of the web-page and receiving tips provided by the first user on the web-page.

7. The method of claim 1, wherein the user interface provides a privacy option permitting the first user to select users of the social networking system who may view the received tip.

8. The method of claim 1, wherein privacy criteria associated with the received tip is provided by the first user, the privacy criteria identifying users of the social networking system having permission to view the received tip when the received tip is provided.

9. The method of claim 1, wherein the relevancy score includes at least one of: an elapsed time since received tip was shared, an endorsement from a local business, and an amount of feedback associated with the received tip.

10. The method of claim 1, wherein the page displaying the selected one or more tips is the second user's social networking system newsfeed.

11. A non-transitory computer-readable storage medium storing executable computer program instructions, the instructions executable to perform steps comprising:
    providing, to a client device associated with a first user of a plurality of users of a social networking system, a user interface for display to the first user;
    receiving from the first user, via the client device, a check-in at a location associated with a page in the social networking system, wherein the page is a social networking system page about at least one of a product, a business, a location, and a topic of interest, and wherein the page is a node in a social graph of the social networking system;
    responsive to receiving the check-in, providing a user interface element for receiving a tip associated with the page;
    receiving, via the client device, a tip from the first user that is associated with the page;
    identifying a plurality of tips, including the received tip, that are associated with the page, the plurality of tips shared by one or more of the plurality of users of the social networking system;
    receiving, via a second client device, a request from a second user of the plurality of users to display one or more of the plurality of tips associated with the page, wherein each tip is associated with privacy criteria that identify users having permission to view that tip;
    determining that the second user meets privacy criteria associated with a set of candidate tips of the plurality of tips;
    selecting, by a computer processor, one or more tips, including the received tip, from the set of candidate tips to display to the second user based in part on the second user meeting the privacy criteria associated with the received tip and a relevancy score associated with the received tip, the relevancy score providing a likelihood the second user will view the received tip and is based in part on a number of interactions between the second user and the first user within the social networking system; and
    responsive to the selecting, providing the page to the second client device, the page displaying the selected one or more tips.

12. The computer-readable medium of claim 11, wherein the received tip comprises at least one of a comment, a question, a short recommendation and a short review.

13. The computer-readable medium of claim 11, wherein the received tip is received in reference to the first user visiting the page.

14. The computer-readable medium of claim 11, wherein the received tip is received in reference to the first user uploading geo-tagged photos, or is in reference to a location of the geo-tagged photo.

15. The computer-readable medium of claim 11, wherein the user interface is also provided to users of the social networking system who at least one of visit the page and upload geo-tagged photos.

16. The computer-readable medium of claim 11, wherein the user interface is also provided to users of the social networking system on a third party web-page, the user interface provided via a social plug-in displaying social networking information on a portion of the web-page and receiving tips provided by the first user on the web-page.

17. The computer-readable medium of claim 11, wherein the user interface provides a privacy option permitting the first user to select users of the social networking system who may view the received tip.

18. The computer-readable medium of claim 11, wherein privacy criteria associated with the received tip is provided by the first user, the privacy criteria identifying users of the social networking system having permission to view the received tip when the received tip is provided.

19. The computer-readable medium of claim 11, wherein the relevancy score includes at least one of: an elapsed time since received tip was shared, an endorsement from a local business, and an amount of feedback associated with the received tip.

20. A system comprising:
   a processor; and
   a non-transitory computer-readable storage medium coupled to the processor, the computer-readable storage medium including instructions executable by the processor to perform steps comprising:
      providing, to a client device associated with a first user of a plurality of users of a social networking system, a user interface for display to the first user;
      receiving from the first user, via the client device, a check-in at a location associated with a page in the social networking system, wherein the page is a social networking system page about at least one of a product, a business, a location, and a topic of interest, and wherein the page is a node in a social graph of the social networking system;
      responsive to receiving the check-in, providing a user interface element for receiving a tip associated with the page;
      receiving, via the client device, a tip from the first user that is associated with the page;
      identifying a plurality of tips, including the received tip, that are associated with the page, the plurality of tips shared by one or more of the plurality of users of the social networking system;
      receiving, via a second client device, a request from a second user of the plurality of users to display one or more of the plurality of tips associated with the page, wherein each tip is associated with privacy criteria that identify users having permission to view that tip;
      determining that the second user meets privacy criteria associated with a set of candidate tips of the plurality of tips;
      selecting, by a computer processor, one or more tips, including the received tip, from the set of candidate tips to display to the second user based in part on the second user meeting the privacy criteria associated with the received tip and a relevancy score associated with the received tip, the relevancy score providing a likelihood the second user will view the received tip and is based in part on a number of interactions between the second user and the first user within the social networking system; and
      responsive to the selecting, providing the page to the second client device, the page displaying the selected one or more tips.

\* \* \* \* \*

UNITED STATES PATENT AND TRADEMARK OFFICE
CERTIFICATE OF CORRECTION

PATENT NO.        : 9,082,129 B2
APPLICATION NO.   : 13/325036
DATED             : July 14, 2015
INVENTOR(S)       : Rohit Dhawan et al.

Page 1 of 1

It is certified that error appears in the above-identified patent and that said Letters Patent is hereby corrected as shown below:

Title page, item (57), Abstract, Should read as follows:

--A social networking system provides tips to users about non-user entities within the social networking system. Tips include short questions, comments, reviews and non-user entities include businesses, products, bands, songs etc. Tips are provided by users of the social networking system, wherein the tips are displayed to other users if the other users meet privacy criteria associated with the tips. Additionally, tips are ranked based on the likelihood that a user will view or read the tip. Tips with the greatest likelihood are ranked higher than those with a lower likelihood. Selected tips with a high likelihood to be viewed are displayed to a viewing user on the topic page or within the user's news feed story.--

Signed and Sealed this
Twelfth Day of July, 2016

Michelle K. Lee
*Director of the United States Patent and Trademark Office*